United States Patent

Orth et al.

[15] 3,697,917
[45] Oct. 10, 1972

[54] SEMICONDUCTOR STRAIN GAGE PRESSURE TRANSDUCER

[72] Inventors: Edward D. Orth, Boxford, Mass.; Alexander J. Yerman, Scotia, N.Y.

[73] Assignee: General Electric Company

[22] Filed: Aug. 2, 1971

[21] Appl. No.: 168,278

[52] U.S. Cl. ..................... 338/2, 73/398 AR, 338/3, 338/4
[51] Int. Cl. ............................................. G01l 1/22
[58] Field of Search........ 338/2, 3, 4, 42; 73/88.5 SD, 73/398 AR; 317/235 M

[56] References Cited

UNITED STATES PATENTS

| | | |
|---|---|---|
| 3,213,681 | 10/1965 | Pearson ..................... 338/4 X |
| 3,568,124 | 3/1971 | Sonderegger ................... 338/4 |
| 3,244,006 | 4/1966 | Delmonte ............. 73/88.5 SD |

*Primary Examiner*—C. L. Albritton
*Attorney*—William S. Wolfe et al.

[57] ABSTRACT

In a pressure transducer of the type utilizing a silicon strain gage diaphragm as a pressure sensor, the diaphragm is bonded to a tubular glass support by an anodic bonding process. Thermally induced stresses and resulting measurement errors are avoided by matching the expansion coefficients of the silicon diaphragm and the glass support. To withstand high operating pressures, the glass diaphragm support is mounted and sealed in the transducer housing so that it is subjected only to compressive forces under operating conditions.

6 Claims, 4 Drawing Figures

PATENTED OCT 10 1972 3,697,917

INVENTORS
EDWARD D. ORTH
ALEXANDER J. YERMAN
BY
*vSWolfe*
ATTORNEY

SEMICONDUCTOR STRAIN GAGE PRESSURE TRANSDUCER

BACKGROUND OF THE INVENTION

This invention relates to pressure transducers of the type utilizing piezoresistive strain gages formed in a flexible diaphragm subjected to a pressure to be measured. More particularly, it relates to an improved mounting arrangement for the diaphragm which prevents measurement errors resulting from diaphragm stresses other than those caused by the pressure to be measured.

Pressure transducers utilizing a strain gage diaphragm as the pressure-sensitive element are known. Recent developments have produced superior diaphragms of the integral type wherein a flexible diaphragm is formed from a monocrystalline semiconductor such as silicon. The strain gage resistance elements are integrally formed on one side of the diaphragm by a diffusion or epitaxial deposition process. This construction eliminates measurement errors previously encountered in bonded strain gage structures caused by slippage between the strain gage elements and the flexible diaphragm on which they are mounted. However, to utilize such strain gage diaphragms in pressure transducers, it is necessary to suitably mount the diaphragm in a housing adapted to be connected to a source of fluid pressure to be measured. For many industrial applications, the pressures to be measured are substantial so that a rugged mounting and sealing arrangement for the pressure-sensing diaphragm is required. In order to achieve adequate strength, the diaphragm is commonly mounted on a support formed of metal by bonding with a suitable adhesive such as epoxy. Because the thermal expansion coefficients of metal support and the silicon diaphragm are substantially different, ambient temperature changes cause strains on the diaphragm giving rise to measurement error. This error arises because thermal stresses applied to the diaphragm cause changes in the measured resistance of the strain gage elements which are indistinguishable from those changes caused by diaphragm bending stresses resulting from changes in the measured pressure. Also, the bond joint may degrade with time or at high temperature causing shifts in the transducer characteristic. Attempts have been made to eliminate these deficiencies by forming the diaphragm support of the same material as the diaphragm, i.e. monocrystalline silicon so that the diaphragm and support will have the same coefficients of expansion. The difficulty with this approach is that the use of silicon as a diaphragm support material is expensive, especially when the support is made large enough to mechanically isolate the diaphragm from a high-strain area near the pressure seal. Also, silicon is a brittle material which is apt to fracture under pressure, especially in regions where there may be surface flaws or cracks.

Accordingly, it is an object of this invention to provide a pressure transducer utilizing a silicon diaphragm with integral strain gages having an improved mounting arrangement for the diaphragm that eliminates measurement errors caused by thermal stressing of the diaphragm.

A further object of the invention is to provide a pressure transducer that is less expensive to manufacture than those presently available.

A still further object of the invention is to provide an improved pressure transducer that can be easily constructed and assembled and is well adapted for mass production.

Further objects and advantages of the invention will become apparent as the following description proceeds.

SUMMARY OF THE INVENTION

In accordance with the invention, the pressure-sensitive silicon diaphragm is mounted on one end of a cylindrical support having an axial bore positioned so that the active area of the diaphragm overlies the bore. The support is formed of a borosilicate glass having a temperature coefficient of expansion approximately the same as the silicon diaphragm to eliminate temperature stresses in the diaphragm. To prevent any slippage between the diaphragm and the support, the restrained edge position of the diaphragm is integrally attached to the support end by an anodic bonding process. The diaphragm support is mounted in the transducer housing in sealed relation therewith so that the end carrying the diaphragm and the adjacent side portions project into a pressure chamber in spaced relation to the housing walls. The mounting arrangement is such that in use the glass diaphragm support is stressed only in compression, thereby greatly reducing the possibility of fracture. Further, the mounting stresses introduced by the pressure seal are mechanically isolated from the diaphragm end of the support. Electrical conductors attached to the strain gage elements on the active area of the diaphragm for resistance measurement are carried on an insulating member which passes to the outside of the housing through the axial bore on the diaphragm support or by other suitable means.

DETAILED DESCRIPTION

Figure 1:
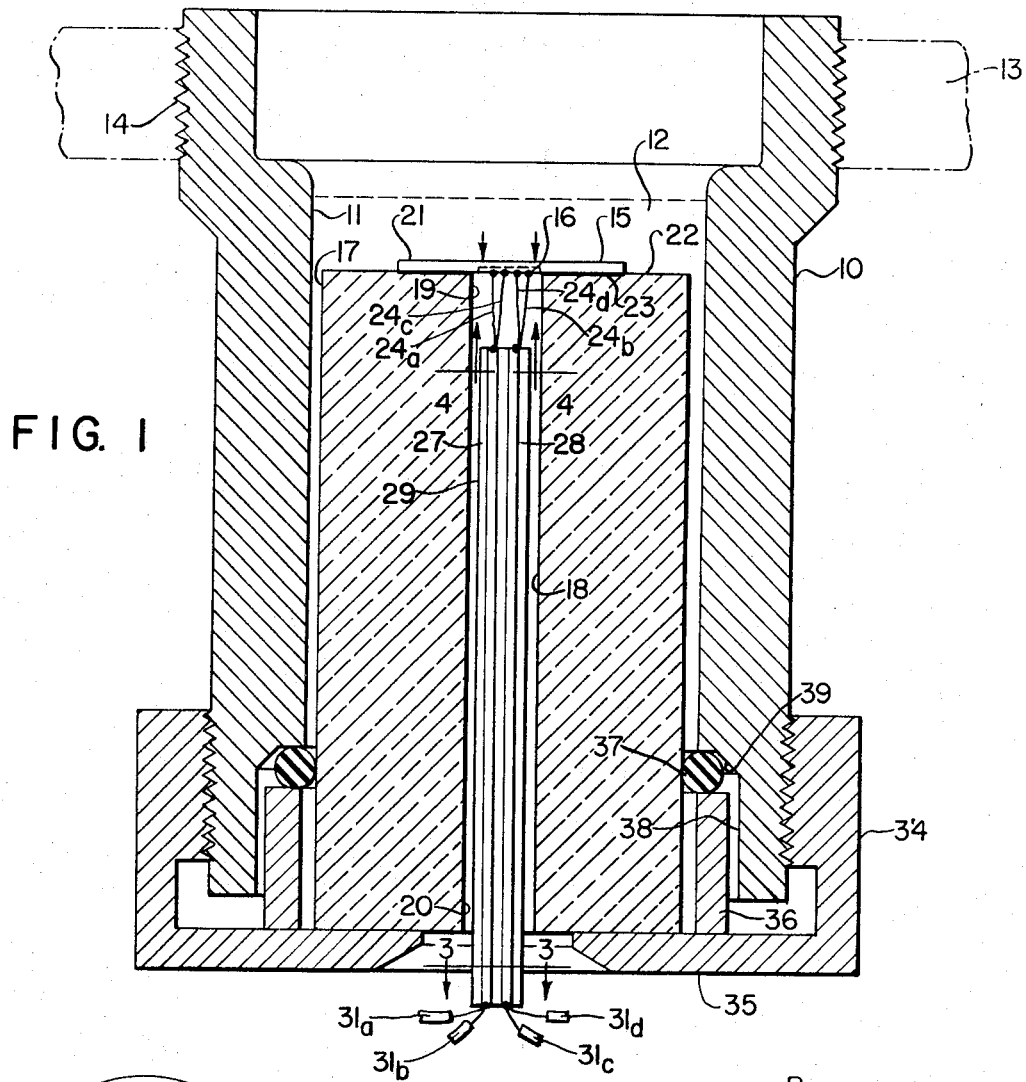
FIG. 1 is a front elevation view in section of a pressure transducer embodying a diaphragm mounting arrangement constructed in accordance with the invention.

Referring to FIG. 1 of the drawing, there is shown a pressure transducer utilizing a pressure-sensitive diaphragm of the strain gage type as the sensor for measuring pressure of a fluid. As shown, the pressure transducer comprises a housing 10 having a bore 11 forming a pressure chamber 12 connected to enclosure 13, such as a tank or pipe line, containing a fluid, the pressure of which is to be measured. The connection between the transducer and the enclosure 13 may, as shown, be made by means of a threaded flange 14 formed on one end of housing 10.

Supported within the pressure chamber 12 is a pressure-sensitive diaphragm 15 which flexes in response to pressure changes in the pressure chamber. The diaphragm is preferably formed of a monocrystalline silicon substrate having piezoresistive strain gage elements 16 as semiconductor stress sensors integrally formed therein by solid state diffusion. Typically, four strain gage elements are placed on the diaphragm so that two are in tension and two are in compression as the diaphragm flexes. These are connected in a Wheatstone bridge circuit by means of which resistance changes are measured as an indication of the pressure in chamber 12. The diaphragm construction is known and may be, for example, similar to that shown in U.S. Pat. No. 3,537,319 Yerman granted Nov. 3, 1970, and assigned to the same assignee as the present invention.

In order to support the diaphragm 15 in the pressure chamber 12 so that opposite sides thereof are exposed to a bending-stress producing differential pressure, there is provided a cylindrical support 17 having an axial bore 18 passing therethrough. The diaphragm is bonded to one end of the support so that its active area carrying the strain gage elements 16 overlies an opening 19 at one end formed by the axial bore 18. Opening 20 at the other end is connected to the atmosphere when the transducer is used to measure gage pressure or alternatively to a source of low pressure or vacuum for absolute pressure measurement, or to a second pressure source for differential pressure measurement. Thus the active area of the diaphragm flexes in accordance with the pressure to be measured.

To prevent measurement errors caused by thermally induced differential expansion between the diaphragm 15 and support 17, the support is formed of a heat resistant glass having a thermal coefficient of expansion approximately the same as that of the diaphragm. One such glass, for example, is a borosilicate glass made by Corning Glass Company and identified as Pyrex number 7740. Preferably, the glass is annealed prior to use to remove any local strains.

Figure 2:
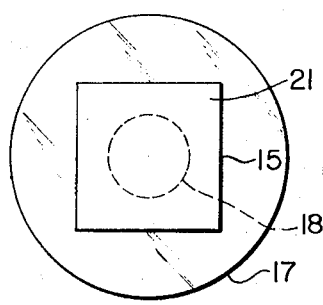
FIG. 2 is a top view of the cylindrical support on which the pressure-sensitive diaphragm is mounted.

To insure that there will be no measurement error caused by slippage between the diaphragm and the support, the restrained edge portion 21 of the diaphragm is integrally connected to support end 22 preferably by an anodic bonding process such as is disclosed in U.S. Pat. 3,397,278 Pomerantz granted Aug. 13, 1968. To make the bond, the support end 22 is first polished to form an optically flat surface adjacent the diaphragm 15. With the diaphragm and support end in aligned contact, the support is heated to increase its electrical conductivity while applying an electrical potential across the elements to be bonded. This produces an electric current flow between the elements and an electrostatic field whereby a bond 23 is formed as disclosed in detail in the above-mentioned Pomerantz patent. The active area of the diaphragm is normally circular and approximately the same size as the area of the bore 18. The outer edge of the diaphragm may be square as shown in FIG. 2 or may be circular or some other suitable shape. The restrained edge portion 21 should be sufficiently deep so that substantially none of the bending stress on the active center area of the diaphragm is transmitted therethrough and thereby cause nonlinearity of the sensor response.

Preferably prior to the bonding process described above, electrical connections are made to the strain gage elements 16 by means of which resistance changes therein, as an indication of pressure across the diaphragm, are measured in a Wheatstone bridge circuit.

Figure 4:
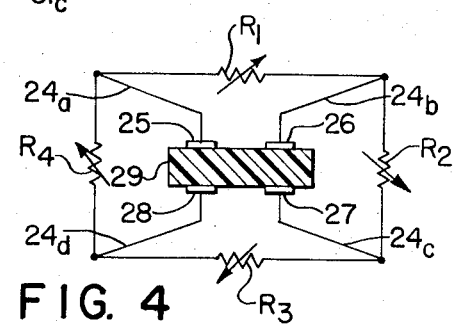
FIG. 4 is a cross sectional view of the lower end of the leadout conductor strip looking in the direction of the section line 4—4 of FIG. 1 along with electrical connections thereto.
Figure 3:
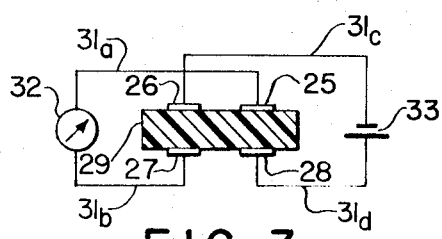
FIG. 3 is a cross sectional view of the upper end of the leadout conductor strip looking in the direction of the section line 3—3 of FIG. 1, along with electrical connections thereto.

Typically, the resistance elements on the diaphragm, illustrated schematically as $R_1$, $R_2$, $R_3$ and $R_4$ in FIG. 4, are formed by diffusion into the diaphragm of a material such as boron, so as to form the four resistance legs of the bridge along with integrally formed interconnect areas and contact pads at the resistance junctions. Such an arrangement is shown, for example, in the above-mentioned Yerman patent. Lead wires 24a, 24b, 24c and 24d, formed of gold or other suitable material, interconnect the four contact pads (not shown) and the upper ends of conductor strips 25, 26, 27 and 28. As best shown in FIGS. 3 and 4, these strips are carried in spaced relation on an insulating leadout strip 29 formed of a suitable heat-resistant material such as alumina and dimensioned to permit insertion into bore 18.

The lower ends of the contact strips are connected by suitable lead wires 31a, 31b, 31c and 31d to a resistance-measuring circuit including a galvanometer 32 and a source of electric potential 33 as shown in FIG. 3.

After the lead wires are connected to the diaphragm resistance elements 16 and the conductor strips 25, 26, 27 and 28, the leadout strip 29 is pushed through the bore 18 to the position shown in FIG. 1. The diaphragm is then placed on support end 22 and held in place by fluid pressure. The bonding of the diaphragm to the support is then performed in the manner described above, after which the strip 29 is immobilized in the bore 18 by injecting adhesive in the open end. If desired, the strain gage elements 16 may be placed on the top of the diaphragm in which case the leads may be attached to the outside of the support 17.

The final diaphragm thickness can be reduced by etching after fabrication has been completed, thus allowing adjustment of pressure sensitivity and removal of any surface damage which might impair the strength of the diaphragm.

The assembled diaphragm 15, support 17 and conductor leadout strip 29 are mounted in housing 10 so as to form a pressuretight seal. For this purpose, there is provided a threaded flange 34 adapted to be screwed onto the lower portion of the housing. The flange has an inwardly extending shoulder 35 on which the lower end of the diaphragm support 17 rests. Also carried by the shoulder 35 is a retaining ring 36 bearing against an O-ring seal 37 located in a recessed portion 38 of the housing When the flange 34 is tightened, the O-ring is forced into sealing contact with the cylindrical support 17 by compression and by action of a cam surface 39 in recess 38. The sealing pressure exerted on the glass support 17 is radial in a direction to exert a compressive force on the support. Because glass is strong in compression, it resists any tendency to fracture due to sealing pressure.

For some applications where an O-ring type of seal is not satisfactory, the support 17 may be a composite body made of a metal tube shank in the seal area with a glass section at one end for the gage mount. This provides greater flexibility in the type of seal used.

In the assembled position shown in FIG. 1, it will be noticed that the diaphragm end 22 of support 17, as well as the adjacent side portions thereof, project into the pressure chamber 12 in spaced relation to the housing walls. Because the bore 18 is connected to a lower pressure than that normally existing in chamber 12, the end 22 of support 17, as well as the side portions above seal 37, experience a compressive force due to the pressure differential being measured. As in the case of the seal pressure, this force direction is desirable since glass is much stronger in compression than in tension. Thus, the construction of the pressure transducer resists any tendency of the glass to fracture under normal operating pressure conditions. Also, it will be noted that the construction permits isolation of the pressure-sensitive diaphragm 15 from any strain in the support 17 caused by compressive forces exerted by the pressure seal 37. This strain isolation is secured by proper selection of the length of support 17 that projects into pressure chamber 12. While the length of the diaphragm support is not particularly critical, good results have been obtained in actual practice by making this projecting length from three to ten times the support diameter. Because the glass tubing from which the support 17 is made is relatively inexpensive, the strain-isolation distance can be made ample without a serious cost penalty.

While the conductor strip 29 is shown as carrying four conductors, a greater number may be used to allow for zero adjustment by external shunting and for other purposes, such as temperature measurement.

From the foregoing, it will be apparent that there has been provided an improved pressure transducer utilizing a pressure-sensitive strain gage diaphragm. The integral bond 23 between the diaphragm 15 and the support 17 prevents any slippage that might cause measurement errors due to hysteresis effects. By forming the support 17 of an inexpensive material such as glass, the cost of the transducer is reduced. Also, by matching the expansion coefficients of the glass support and the silicon diaphragm, thermal stresses causing measurement error are eliminated. Further, by providing a construction wherein the glass diaphragm support is stressed only in compression, any tendency to fracture when subjected to high operating pressures is greatly reduced.

A still further advantage of the invention is the fact that the pressure transducer can be manufactured in small sizes as compared with prior art transducers having comparable pressure ranges and sensitivity. For example, in a pressure transducer embodying the invention and calibrated to measure gage pressure in the range of 0 – 900 psi, the active diameter of the strain gage is approximately 0.080 inch with a thickness of 0.008 inch. The inside and outside diameters of the tubular glass support and its length are respectively 0.080 inch, 0.300 inch and 1.75 inches.

While there has been shown what is presently considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. A pressure transducer comprising:
   a. a housing having walls forming a chamber adapted to be connected to a source of pressure to be measured;
   b. a diaphragm formed of monocrystalline silicon having disposed on one side of an active area thereof a pattern of piezoresistive strain gages;
   c. a cylindrical support member for the diaphragm formed of glass with an axial bore, the diaphragm having a restrained edge portion integrally bonded to one end of the glass support member so that the active diaphragm area overlies the axial bore;
   d. means mounting the support member on the housing in sealed relation therewith so that the end carrying the diaphragm and adjacent side portions of the support project into the chamber in spaced relation to the housing walls and with the axial bore at the opposite end of the support opening outside the housing whereby the diaphragm is isolated from mechanical mounting strains and the glass supporting member is stressed in compression when the chamber is pressurized; and
   e. electrical conductors connected to the strain gage and passing outwardly from the housing.

2. The pressure transducer of claim 1 wherein the diaphragm support member is formed of a borosilicate glass having a temperature coefficient of expansion approximately equal to that of the silicon diaphragm to reduce diaphragm strains caused by temperature changes.

3. The pressure transducer of claim 1 wherein the electrical conductors comprise spaced strips of conducting material carried on a strip of insulating substrate extending through the bore.

4. A pressure transducer comprising:
   a. a housing having interior walls forming a pressure chamber; and
   b. a diaphragm assembly mounted on the housing so as to project into the pressure chamber, the diaphragm assembly comprising;
      i. an elongated glass support having an axial bore; and
      ii. a strain-sensitive silicon diaphragm mounted on one end of the support so as to overlie the bore, the diaphragm having a restrained outer edge portion integrally bonded to the support by an anodic bonding process.

5. The pressure transducer of claim 4 including electrical conductors fastened the underside of the diaphragm and extending through the bore outside of the housing.

6. The pressure transducer of claim 5 including an insulating strip supporting the conductors, said strip being dimensioned to be received in the bore.

* * * * *